US007878177B2

(12) United States Patent
Czekala et al.

(10) Patent No.: US 7,878,177 B2
(45) Date of Patent: Feb. 1, 2011

(54) INTERNAL COMBUSTION ENGINE HAVING COMMON POWER SOURCE FOR ION CURRENT SENSING AND FUEL INJECTORS

(75) Inventors: Michael Damian Czekala, Canton, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 11/876,798

(22) Filed: Oct. 23, 2007

(65) Prior Publication Data

US 2009/0101114 A1 Apr. 23, 2009

(51) Int. Cl.
*F02D 41/00* (2006.01)
*F02P 5/15* (2006.01)
*G06F 19/00* (2006.01)

(52) U.S. Cl. ................... 123/435; 701/104; 123/406.47

(58) Field of Classification Search ......... 701/103-105; 123/299, 435, 305, 480, 601, 605, 608, 637, 123/406.47
See application file for complete search history.

(56) References Cited

U.S. PATENT DOCUMENTS

| | | | | |
|---|---|---|---|---|
| 4,337,746 | A | 7/1982 | Masaki | |
| 5,425,339 | A | 6/1995 | Fukui | |
| 5,460,129 | A | 10/1995 | Miller et al. | |
| 5,495,841 | A * | 3/1996 | Gillbrand et al. | 123/492 |
| 5,572,975 | A * | 11/1996 | Gillbrand et al. | 123/478 |
| 5,769,049 | A * | 6/1998 | Nytomt et al. | 123/435 |
| 6,029,627 | A | 2/2000 | VanDyne | |
| 6,032,650 | A * | 3/2000 | Rask | 123/435 |
| 6,196,054 | B1 * | 3/2001 | Okamura et al. | 73/35.08 |
| 6,199,540 | B1 * | 3/2001 | Katashiba et al. | 123/478 |
| 6,246,952 | B1 | 6/2001 | Honda | |
| 6,343,500 | B1 * | 2/2002 | Katogi et al. | 73/35.08 |
| 6,520,149 | B2 | 2/2003 | Kokubo et al. | |
| 6,526,954 | B1 | 3/2003 | Baranzahi et al. | |
| 6,741,080 | B2 | 5/2004 | Peterson et al. | |
| 6,748,922 | B2 | 6/2004 | Uchida et al. | |
| 6,883,509 | B2 | 4/2005 | Porter et al. | |
| 6,886,547 | B2 | 5/2005 | Butler, Jr. | |

(Continued)

FOREIGN PATENT DOCUMENTS

GB 2396754 A 6/2004

(Continued)

OTHER PUBLICATIONS

Schneider, et al., An Investigation of the Impact of Cycle-to-cycle Variations on the Ionic Current Signal in SI Engines, SAE 2000-01-1943, Jun. 19-22, 2000.

(Continued)

*Primary Examiner*—Willis R. Wolfe, Jr.
*Assistant Examiner*—Johnny H Hoang
(74) *Attorney, Agent, or Firm*—Julia Voutyras; Brooks Kushman P.C.

(57) ABSTRACT

A system and method for controlling operation of a multiple cylinder internal combustion engine having fuel injectors and an ionization current sensor include a high-voltage power supply connectable to, and supplying substantially the same nominal boosted voltage relative to nominal battery voltage to, the fuel injectors and ionization sensor during at least a portion of the engine operation.

20 Claims, 3 Drawing Sheets

U.S. PATENT DOCUMENTS

| | | | | |
|---|---|---|---|---|
| 6,910,449 | B2 | 6/2005 | Strom et al. | |
| 6,922,057 | B2 | 7/2005 | Zhu et al. | |
| 6,922,628 | B2 | 7/2005 | Zhu et al. | |
| 6,945,229 | B1 | 9/2005 | Zhu et al. | |
| 6,951,201 | B2 | 10/2005 | Zhu et al. | |
| 7,005,855 | B2 | 2/2006 | Zhu et al. | |
| 7,059,296 | B2 | 6/2006 | Strom et al. | |
| 7,063,079 | B2 | 6/2006 | Huberts et al. | |
| 7,086,382 | B2 | 8/2006 | Daniels et al. | |
| 7,117,852 | B2 * | 10/2006 | Santero et al. | 123/490 |
| 7,137,385 | B2 | 11/2006 | Newton | |
| 7,156,070 | B2 | 1/2007 | Strom et al. | |
| 7,191,765 | B2 * | 3/2007 | Santero | 123/490 |
| 7,251,557 | B2 | 7/2007 | Strom et al. | |
| 7,255,080 | B1 | 8/2007 | Leone | |
| 7,392,793 | B2 * | 7/2008 | Hayakawa | 123/479 |
| 7,546,830 | B2 * | 6/2009 | Nagase et al. | 123/490 |
| 7,621,259 | B2 * | 11/2009 | Mayuzumi | 123/490 |
| 2004/0083717 | A1 | 5/2004 | Zhu et al. | |
| 2004/0083794 | A1 | 5/2004 | Zhu et al. | |
| 2004/0084018 | A1 | 5/2004 | Zhu et al. | |
| 2004/0084019 | A1 | 5/2004 | Zhu et al. | |
| 2004/0084025 | A1 | 5/2004 | Zhu et al. | |
| 2004/0084026 | A1 | 5/2004 | Zhu et al. | |
| 2004/0084034 | A1 | 5/2004 | Huberts et al. | |
| 2004/0084035 | A1 | 5/2004 | Newton | |
| 2004/0085068 | A1 | 5/2004 | Zhu et al. | |
| 2004/0085069 | A1 | 5/2004 | Zhu et al. | |
| 2004/0085070 | A1 | 5/2004 | Daniels et al. | |
| 2004/0088102 | A1 | 5/2004 | Daniels et al. | |
| 2005/0028786 | A1 | 2/2005 | Zhu et al. | |
| 2005/0050948 | A1 | 3/2005 | Zhu et al. | |
| 2005/0055169 | A1 | 3/2005 | Zhu et al. | |
| 2005/0090966 | A1 | 4/2005 | Strom et al. | |
| 2005/0126537 | A1 | 6/2005 | Daniels et al. | |
| 2005/0211219 | A1 | 9/2005 | Strom et al. | |
| 2005/0247064 | A1 | 11/2005 | Lieuwen | |
| 2006/0042355 | A1 | 3/2006 | Zhu et al. | |
| 2006/0162689 | A1 * | 7/2006 | Winkelman et al. | 123/299 |
| 2006/0241848 | A1 | 10/2006 | Strom et al. | |
| 2007/0095326 | A1 | 5/2007 | Strom et al. | |
| 2007/0215101 | A1 | 9/2007 | Russell et al. | |
| 2007/0215102 | A1 | 9/2007 | Russell et al. | |
| 2007/0215104 | A1 | 9/2007 | Hahn | |
| 2007/0215107 | A1 | 9/2007 | Shelby et al. | |
| 2007/0215111 | A1 | 9/2007 | Surnilla | |
| 2007/0215130 | A1 | 9/2007 | Shelby et al. | |

FOREIGN PATENT DOCUMENTS

| | | |
|---|---|---|
| JP | 57-193757 | 11/1982 |
| JP | 11-082149 A | 8/1997 |

OTHER PUBLICATIONS

Yutaka Ohashi et al., The Application of Ionic Current Detection System for the Combustion Condition Control, SAE 1999-01-0550, Mar. 1-4, 1999.

Schneider et al., Real-Time Air/Fuel-Ration Control in a Small SI Engine Using the Ionic Current Signal, SAE 1999-01-3323, JSAE 9938078, Sep. 28-30, 1999.

Wilstermann et al., Ignition System Integrated AC Ion Current Sensing for Robust and Reliable Online Engine Control, SAE 2000-01-0553, Mar. 6-9, 2000.

Schneider et al., An Investigation of the Impact of Cycle-to-Cycle Variations on the Ionic Current Signal in SI Engines, SAE 2000-01-1943, Jun. 19-22, 2000.

Toon de Bie, et al. A Novel Start Algorithm for CNG Engines Using Ion Sense Technology, SAE 2000-01-2800, Oct. 16-19, 2000.

Noriaki Kondo, et al., Combustion Monitoring by use of the Spark Plug for DI Engine, SAE 2001-01-0994, Mar. 5-8, 2001.

Yoshiyama, et al., Combustion Diagnostics of a Spark Ignition Engine Using a Spark Plug as an Ion Probe, SAE 2002-01-2838, Oct. 21-24, 2002.

Malaczynski, et al., Real-Time Digital Signal Processing of Ionization Current for Engine Diagnostic and Control, SAE 2003-01-1119, Mar. 3-6, 2003.

Strandh, et al., Ion Current Sensing for HCCI Combustion Feedback, SAE 2003-01-3216, 2003.

Huang, et al., Effects of Engine Operating Conditions on In-Cylinder Air/Fuel Ratio Detection Using a Production Ion Sensing Device, SAE 2004-01-0515, Mar. 8-11, 2004.

Vressner, et al., Multiple Point Ion Current Diagnostics in an HCCI Engine, SAE 2004-01-0934, Mar. 8-11, 2004.

Shimasaki, et al., Study on Combustion Monitoring System for Formula One Engines Using Ionic Current Measurement, SAE 2004-01-1921, Jun. 8-10, 2004.

Huang, Yiqun, et al., Investigation of an In-cylinder Ion Sensing Assisted HCCI Control Strategy, SAE2005-01-0068, Apr. 11-14, 2005.

Vressner, et al., Fuel Effects on Ion Current in an HCCI Engine, SAE 2005-01-2093, 2005.

Yoshiyama, et al., Ion Current During the Exhaust Process Under the Idling Condition in a Spark Ignition Engine, SAE 2005-01-3872, Oct. 24-27, 2005.

Rado, et al., Significance of Burn Types, as Measured by Using the Spark Plugs as Ionization Probes, with Respect to the Hydrocarbon Emission Levels in S.I. Engines, SAE 750354, Feb. 24-28, 1975.

Saltzkoff, et al., An Ionization Equilibrium Analysis of the Spark Plug as an Ionization Sensor, SAE960337, Feb. 26-29, 1996.

Fei An, et al., Combustion Diagnostics in Methane-Fueled SI Engines Using the Spark Plug as an Ionization Probe, SAE970033, Feb. 24-27, 1997.

Eriksson, et al., Closed Loop Ignition Control by Ionization Current Interpretation, SAE 970854, Feb. 24-27, 1997.

Reinmann, et al., Local Air-Fuel Ratio Measurements Using the Spark Plug as an Ionization Sensor, SAE 970856, Feb. 24-27, 1997.

Saltzkoff, et al., In-Cylinder Pressure Measurements Using the Spark Plug as an Ionization Sensor, SAE 970857, Feb. 24-27, 1997.

Asano, et al., Development of New Ion Current Combustion Control System, SAE 980162, Feb. 23-26, 1998.

Balles, et al., In-Cylinder Air/Fuel Ratio Approximation Using Spark Gap Ionization Sensing, SAE 980166, Feb. 23-26, 1998.

Ohashi, et al., The Application of Ionic Current Detection System for the Combustion Limit Control, SAE 980171, Feb. 23-26, 1998.

GB Search Report dated Oct. 7, 2008 from related application GB 0812462.0 (3 pgs.).

* cited by examiner

INTERNAL COMBUSTION ENGINE HAVING COMMON POWER SOURCE FOR ION CURRENT SENSING AND FUEL INJECTORS

BACKGROUND

1. Technical Field

The present disclosure relates to systems and methods for supplying power for fuel injection and for ionization current sensing in internal combustion engines.

2. Background Art

Various types of spark-ignition, compression-ignition, and combination internal combustion engines use direct injection of fuel into the combustion chamber to reduce fuel consumption and feedgas emissions. These may include direct-injection spark-ignition (DISI) engines fueled by gasoline or gasoline/alcohol mixtures, compression-ignition engines fueled by diesel fuel, or combination engines fueled by gasoline or other fuels that may operate in a spark-ignition mode and a compression-ignition mode, sometimes referred to as homogeneous charge compression ignition (HCCI) mode, for example. A high-voltage power supply may be provided to generate the current required for desired performance of the fuel injectors for these applications, with representative voltages in the range of 60V or more compared to the nominal battery voltage of 12V or 24V, for example.

Manufacturers continue to improve control of internal combustion engines to enhance fuel economy and performance while reducing feedgas emissions using more sophisticated sensing and processing hardware and software. To improve control of the combustion process, ionization current sensing (or ion sense) uses a bias voltage applied across a sensor positioned within the combustion chamber to generate a current signal indicative of the combustion quality and timing. The bias voltage for reliable ion current signals often exceeds the voltage available directly from the vehicle battery so that a boost circuit or high voltage power supply is need to provide a bias voltage in the range of 85V or more, for example. Some spark-ignition engines provide the high-voltage supply by switching the ignition coil or using the ignition coil to charge a capacitor during the spark generation and then discharge the capacitor to provide the bias voltage during the ion sense period. While suitable for some applications, these systems do not provide a bias voltage for ion sense when no spark is generated, such as during compression-ignition mode in HCCI engines, for example.

SUMMARY

A system and method for operating a multiple cylinder internal combustion engine having fuel injectors and an ionization current sensor include a high-voltage power supply connectable to, and supplying substantially the same nominal boosted voltage relative to nominal battery voltage to, the fuel injectors and ionization sensor during at least a portion of the engine operation.

In one embodiment a direct injection multiple cylinder internal combustion engine includes an electrical system powered at least in part by a battery having an associated battery voltage, a fuel injector associated with each cylinder and configured to inject fuel directly into the combustion chamber of an associated cylinder in response to control signals during operation of the engine, at least one ionization sensor positioned within one of the cylinders, and at least one high-voltage power supply connected to at least one fuel injector and at least one ionization sensor for supplying a voltage higher than the battery voltage for operation of the fuel injector and the ionization sensor. Embodiments include ionization current sensors implemented by dedicated sensors, or by combination devices, such as a spark plug or glow plug, for example.

The present disclosure includes embodiments having various advantages. For example, the systems and methods of the present disclosure can provide ionization current sensing whether or not a spark plug discharge is provided, such as in compression ignition engines or operating modes, which include diesel engines and HCCI engines, for example. Using the high-voltage supply in spark-ignited applications for ignition coil charging facilitates more agile ignition timing with shorter ignition coil charge times and shorter dwell times, which in turn provides a larger time period for collecting ionization current data that is typically masked during coil/spark discharge. Using a single high-voltage power supply to actuate injectors and ionization sensing may provide a cost savings and reduce the number of control module pins required when the power supply is integrated in the engine controller.

The above advantages and other advantages and features will be readily apparent from the following detailed description of the preferred embodiments when taken in connection with the accompanying drawings.

DETAILED DESCRIPTION OF THE DRAWINGS

DETAILED DESCRIPTION OF EMBODIMENT(S)

Figure 1:
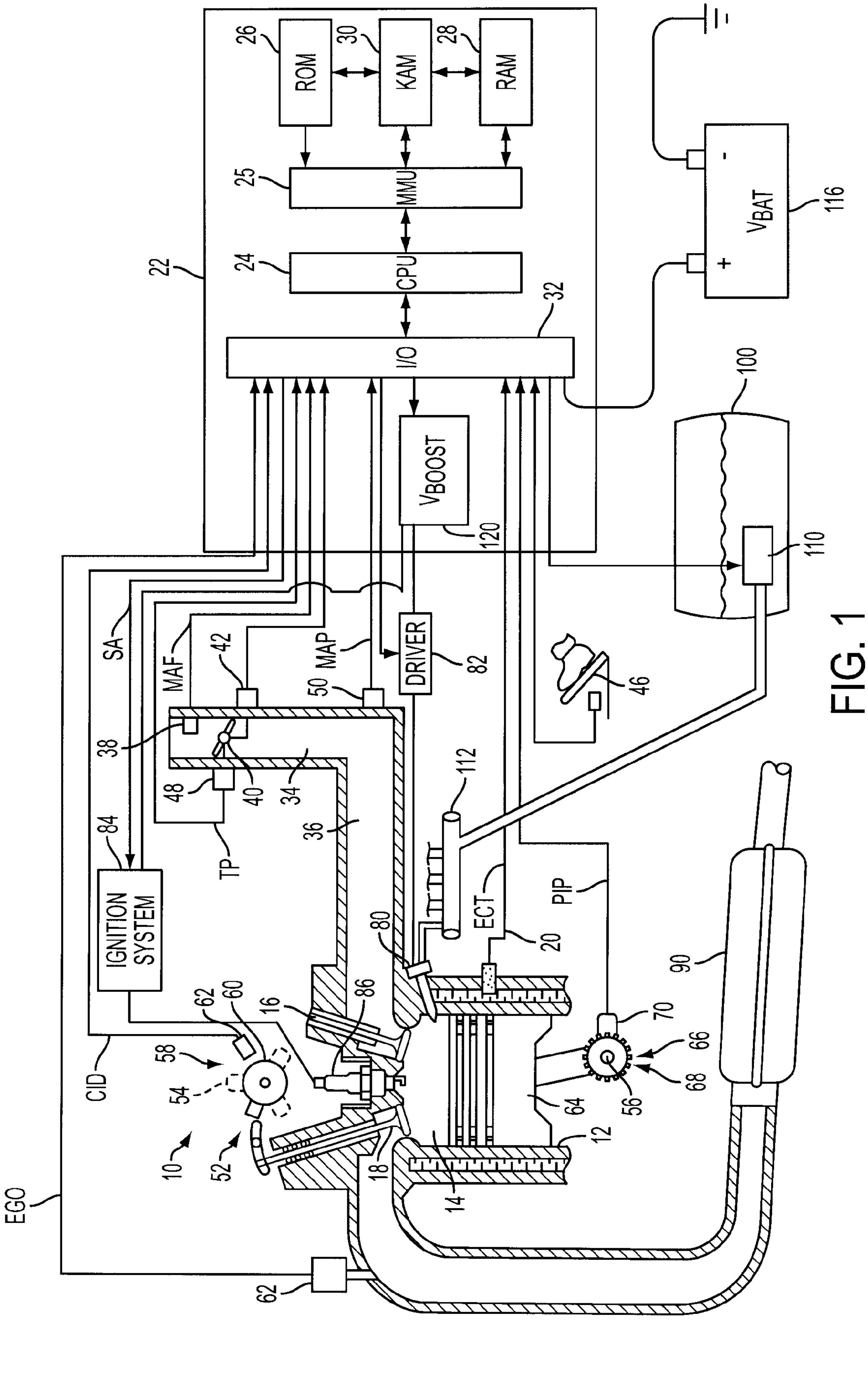
FIG. 1 is a block diagram illustrating operation of a system or method for controlling a direct injection internal combustion engine having a common power source for injectors and ion sense according to one embodiment of the present disclosure.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a, multi-cylinder, internal combustion engine with direct or in-cylinder injection and an ion sensing system that uses a spark plug, glow plug, or dedicated ionization sensor disposed within the cylinders. Those of ordinary skill in the art may recognize similar applications or implementations with other engine/vehicle technologies.

System 10 includes an internal combustion engine having a plurality of cylinders, represented by cylinder 12, with corresponding combustion chambers 14. As one of ordinary skill in the art will appreciate, system 10 includes various sensors and actuators to effect control of the engine. A single sensor or actuator may be provided for the engine, or one or more sensors or actuators may be provided for each cylinder 12, with a representative actuator or sensor illustrated and described. For example, each cylinder 12 may include four actuators that operate intake valves 16 and exhaust valves 18 for each cylinder in a multiple cylinder engine. However, the engine may include only a single engine coolant temperature sensor 20.

Controller 22 has a microprocessor 24, which is part of a central processing unit (CPU), in communication with memory management unit (MMU) 25. MMU 25 controls the movement of data among various computer readable storage media and communicates data to and from CPU 24. The computer readable storage media preferably include volatile and nonvolatile storage in read-only memory (ROM) 26, random-access memory (RAM) 28, and keep-alive memory (KAM) 30, for example. KAM 30 may be used to store various operating variables while CPU 24 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 24 in controlling the engine or vehicle into which the engine is mounted. The computer-readable storage media may also include floppy disks, CD-ROMs, hard disks, and the like.

System 10 includes an electrical system powered at least in part by a battery 116 providing a nominal voltage, $V_{BAT}$, which is typically either 12V or 24V, to power controller 22. As will be appreciated by those of ordinary skill in the art, the nominal voltage is an average design voltage with the actual steady-state and transient voltage provided by the battery varying in response to various ambient and operating conditions that may include the age, temperature, state of charge, and load on the battery, for example. Power for various engine/vehicle accessories may be supplemented by an alternator/generator during engine operation as well known in the art. A high-voltage power supply 120 generates a boosted nominal voltage, $V_{BOOST}$, relative to the nominal battery voltage and may be in the range of 85V-100V, for example, depending upon the particular application and implementation. Power supply 120 is used to power fuel injectors 80 and an ionization sensor, such as spark plug 86. As illustrated in the embodiment of FIG. 1, the high-voltage power supply 120 may be integrated with control module 22. Alternatively, an external high-voltage power supply may be provided if desired. Although illustrated as a single functional block in FIG. 1, some applications may have multiple internal or external high-voltage power supplies 120 that each service components associated with one or more cylinders or cylinder banks, for example.

CPU 24 communicates with various sensors and actuators via an input/output (I/O) interface 32. Interface 32 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 24. Examples of items that are actuated under control by CPU 24, through I/O interface 32, are fuel injection timing, fuel injection rate, fuel injection duration, throttle valve position, spark plug ignition timing (in the event that engine 10 is a spark-ignition engine), ionization current sensing and conditioning, and others. Sensors communicating input through I/O interface 32 may indicate piston position, engine rotational speed, vehicle speed, coolant temperature, intake manifold pressure, accelerator pedal position, throttle valve position, air temperature, exhaust temperature, exhaust air to fuel ratio, exhaust constituent concentration, and air flow, for example. Some controller architectures do not contain an MMU 25. If no MMU 25 is employed, CPU 24 manages data and connects directly to ROM 26, RAM 28, and KAM 30. Of course, the present invention could utilize more than one CPU 24 to provide engine control and controller 22 may contain multiple ROM 26, RAM 28, and KAM 30 coupled to MMU 25 or CPU 24 depending upon the particular application.

In operation, air passes through intake 34 and is distributed to the plurality of cylinders via an intake manifold, indicated generally by reference numeral 36. System 10 preferably includes a mass airflow sensor 38 that provides a corresponding signal (MAF) to controller 22 indicative of the mass airflow. A throttle valve 40 may be used to modulate the airflow through intake 34. Throttle valve 40 is preferably electronically controlled by an appropriate actuator 42 based on a corresponding throttle position signal generated by controller 22. The throttle position signal may be generated in response to a corresponding engine output or demanded torque indicated by an operator via accelerator pedal 46. A throttle position sensor 48 provides a feedback signal (TP) to controller 22 indicative of the actual position of throttle valve 40 to implement closed loop control of throttle valve 40.

A manifold absolute pressure sensor 50 is used to provide a signal (MAP) indicative of the manifold pressure to controller 22. Air passing through intake manifold 36 enters combustion chamber 14 through appropriate control of one or more intake valves 16. Intake valves 16 and exhaust valves 18 may be controlled using a conventional camshaft arrangement, indicated generally by reference numeral 52. Camshaft arrangement 52 includes a camshaft 54 that completes one revolution per combustion or engine cycle, which requires two revolutions of crankshaft 56 for a four-stroke engine, such that camshaft 54 rotates at half the speed of crankshaft 56. Rotation of camshaft 54 (or controller 22 in a variable cam timing or camless engine application) controls one or more exhaust valves 18 to exhaust the combusted air/fuel mixture through an exhaust manifold. A cylinder identification sensor 58 provides a signal (CID) once each revolution of the camshaft or equivalently once each combustion cycle from which the rotational position of the camshaft can be determined. Cylinder identification sensor 58 includes a sensor wheel 60 that rotates with camshaft 54 and includes a single protrusion or tooth whose rotation is detected by a Hall effect or variable reluctance sensor 62. Cylinder identification sensor 58 may be used to identify with certainty the position of a designated piston 64 within cylinder 12 for use in determining fueling or ignition timing, for example.

Additional rotational position information for controlling the engine is provided by a crankshaft position sensor 66 that includes a toothed wheel 68 and an associated sensor 70. In one embodiment, toothed wheel 68 includes thirty-five teeth equally spaced at ten-degree (10°) intervals with a single twenty-degree gap or space referred to as a missing tooth. In combination with cylinder identification sensor 58, the missing tooth of crankshaft position sensor 66 may be used to generate a signal (PIP) used by controller 22 for fuel injection and ignition timing. A dedicated integrated circuit chip (EDIS) within controller 22 may be used to condition/process the raw rotational position signal generated by position sensor 66 and outputs a signal (PIP) once per cylinder per combustion cycle. Crankshaft position sensor 66 may also be used to determine engine rotational speed and to identify cylinder combustion events based on an absolute, relative, or differential engine rotation speed where desired.

An exhaust gas oxygen sensor 62 provides a signal (EGO) to controller 22 indicative of whether the exhaust gasses are lean or rich of stoichiometry. Depending upon the particular application, sensor 62 may provide a two-state signal corresponding to a rich or lean condition, or alternatively a signal that is proportional to the stoichiometry of the exhaust feedgas. This signal may be used to adjust the air/fuel ratio, or control the operating mode of one or more cylinders, for example. The exhaust gas is passed through the exhaust manifold and one or more emission control or treatment devices 90 before being exhausted to atmosphere.

A fuel delivery system includes a fuel tank 100 with a fuel pump 110 for supplying fuel to a common fuel rail 112 that supplies injectors 80 with pressurized fuel. In some direct-injection applications, a camshaft-driven high-pressure fuel pump (not shown) may be used in combination with a low-pressure fuel pump 110 to provide a desired fuel pressure within fuel rail 112. Fuel pressure may be controlled within a predetermined operating range by a corresponding signal from controller 22. In the representative embodiment illustrated in FIG. 1, fuel injector 80 is side-mounted on the intake side of combustion chamber 14, typically between intake valves 16, and injects fuel directly into combustion chamber 14 in response to a command signal from controller 22 processed by driver 82. Of course, the present disclosure may also be applied to applications having fuel injector 80 centrally mounted through the top or roof of cylinder 14.

Driver 82 may include various circuitry and/or electronics to selectively supply power from high-voltage power supply 120 to actuate a solenoid associated with fuel injector 80 as described in greater detail with reference to FIGS. 2-3 and may be associated with an individual fuel injector 80 or multiple fuel injectors, depending on the particular application and implementation. Although illustrated and described with respect to a direct-injection application where fuel injectors often require high-voltage actuation, those of ordinary skill in the art will recognize that the teachings of the present disclosure may also be applied to applications that use port injection or combination strategies with multiple injectors per cylinder and/or multiple fuel injections per cycle.

In the embodiment of FIG. 1, fuel injector 80 injects a quantity of fuel directly into combustion chamber 14 in one or more injection events for a single engine cycle based on the current operating mode in response to a signal (fpw) generated by controller 22 and processed and powered by driver 82. At the appropriate time during the combustion cycle, controller 22 generates a signal (SA) processed by ignition system 84 to control spark plug 86 and initiate combustion within chamber 14, and to subsequently apply a high-voltage bias across spark plug 86 to enable ionization current sensing as described herein. Depending upon the particular application, the high-voltage bias may be applied across the spark gap or between the center electrode of spark plug 86 and the cylinder wall. Ignition system 84 may include one or more ignition coils and other circuitry/electronics to actuate associated spark plugs 86 and provide ion sensing. Charging of the ignition coil may be powered by high-voltage power supply 120 or by battery voltage as described with reference to FIGS. 2 and 3, respectively. However, use of the boosted voltage provided by high-voltage power supply 120 may provide various advantages, such as reducing ignition coil charge time and dwell time, which generally allows greater ignition timing flexibility and/or a longer ionization sensing period.

In one embodiment, each spark plug 86 includes a dedicated coil and associated electronics. Alternatively, a single ignition system 84 may be associated with multiple spark plugs 86. In addition, ignition system 84 may include various components to provide ionization current sensing as describe with reference to FIGS. 2-3. The representative embodiment illustrated includes a single spark plug 86 in each cylinder that functions to ignite the fuel mixture and then as the ion sensor as described herein. However, the present disclosure may be used in applications that use dual spark plugs with one or both providing mixture ignition and/or ion sensing. Likewise, embodiments of the present disclosure may incorporate other types of devices that may be used to provide an ionization signal, such as a glow plug or a special-purpose, dedicated ionization sensor. According to the present disclosure, at least one common power supply 120 is connected to at least one fuel injector 80 and at least one ionization sensor (implemented by spark plug 86 in the representative embodiment illustrated) and supplies a voltage $V_{BOOST}$ higher than the battery voltage $V_{BAT}$ during at least a portion of the engine operating cycle as described in greater detail herein.

Controller 22 includes software and/or hardware implementing control logic to control system 10. In one embodiment, controller 22 controls high-voltage power supply 120, fuel injector 80, and spark plug 86 such that power supply 120 selectively provides substantially the same boosted nominal voltage (relative to battery voltage) to fuel injector 80 via driver 82 and to spark plug 86 via ignition system 84. Of course, the actual voltages may vary as a function of ambient and operating conditions. Similarly, different boosted nominal voltage may be supplied to the fuel injectors 80 and spark plugs 86 or other ionization current sensors depending upon the particular application and implementation.

Figure 2:
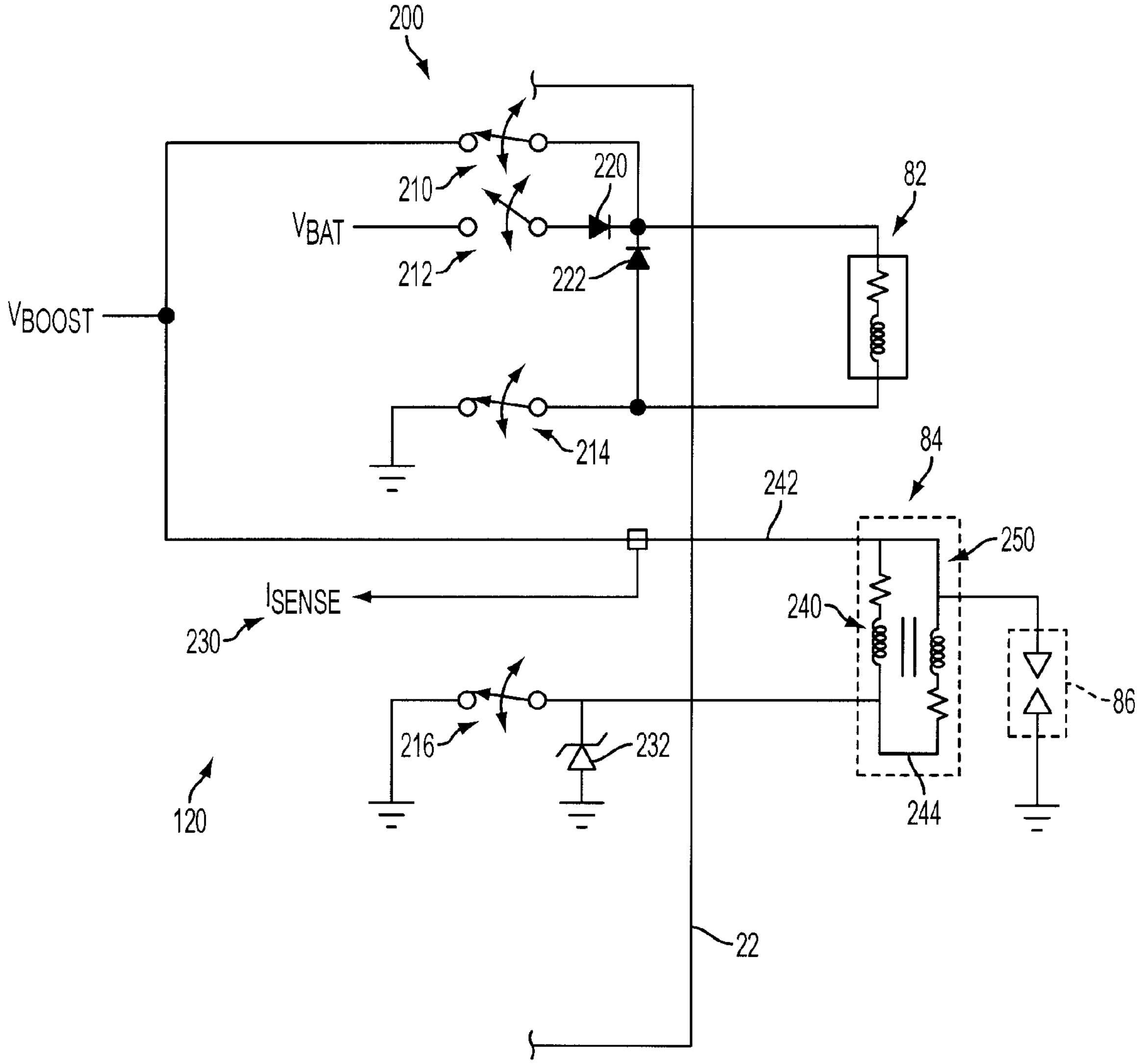
FIG. 2 is a simplified schematic illustrating one embodiment of an engine controller with a common power source for injectors and ion sense according to the present disclosure.

FIG. 2 is a simplified schematic illustrating connections for, and operation of, an integrated high-voltage power supply according to one embodiment of the present disclosure. In this embodiment, power supply 120 is integrated with engine/vehicle controller 22 and includes a plurality of switches 200 for selectively connecting various inputs/outputs in response to the control logic within controller 22 during operation. Switches 22 may be implemented by one or more types of solid-state devices, such as transistors and/or relays, for example, and are operated in response to control signals to selectively supply substantially the same nominal voltage to the fuel injectors and ionization sensors from the same high-voltage power supply 120 during different portions of the engine operating cycle. The present disclosure recognizes that operation of the fuel injector solenoids 82 generally requires a high voltage and corresponding high current to initiate the fuel injection event followed by a lower voltage and associated holding current to complete the event. As such, the high-voltage power supply is used for only a small portion of the operating cycle. Ionization current sensing also uses a high-voltage bias to generate a very small (on the order of microamperes) current during a different portion of the engine operating cycle (after ignition) so that a common high-voltage power supply may be used. For spark-ignition applications, the high-voltage power supply may also be used to charge the ignition coil so that charging times and dwell times may be reduced as previously described.

In operation, switch 210 and switch 214 are closed to selectively connect fuel injector solenoid 82 to the high-voltage supply, $V_{BOOST}$. Current is blocked by diodes 220 and 222 and flows through solenoid coil 82 to initiate a fuel injection event. A holding current may subsequently be applied using battery voltage and appropriate actuation of switches 210, 212, and 214 to complete the fuel injection event. Substantially the same voltage from the high-voltage supply 120 may be used to charge ignition coil 84 to generate a spark across the air gap of spark plug 86, and subsequently to apply a bias voltage to induce an ionization current signal, $I_{sense}$, indicative of combustion quality and timing within the corresponding cylinder. To charge ignition coil 84, switch 216 is closed connecting one side 244 of primary winding 240 to ground with the other side 242 of primary winding 240 connected to the boost voltage causing current to flow through primary winding 240. Soft turn-on technology may be used to ensure that the spark discharge event does not occur at the initiation of coil charging rather than the at the desired coil turn-off time. When the control logic of controller 22 generates a spark signal, switch 216 is opened to collapse the magnetic field of coil 84 and induce a high voltage (on the order of kilovolts) in secondary winding 250 resulting in a spark discharge across the electrodes of spark plug 86 to initiate combustion within the corresponding cylinder. The boost voltage is then used as a bias voltage across spark plug 86 with ions generated during combustion of the fuel/air mixture within the cylinder conducting across the air gap of spark plug 86 and generating a small ionization current 230 detected by controller 22. A current mirror or similar circuitry may be integrated into ignition system 84 or controller 22 to detect and amplify the ionization current signal.

As illustrated in the embodiment of FIG. 2, the bias voltage for the ionization sensing is provided by the high-voltage power supply 120 rather than a charge capacitor or the ignition coil itself so that ionization sensing may be provided whether or not the coil is charged to initiate a spark. In the example above, if the engine subsequently operating in a HCCI mode, the bias voltage may still be applied across the electrodes (or from an electrode to cylinder wall) of spark plug 86 without closing switch 216 to charge the ignition coil.

Figure 3:
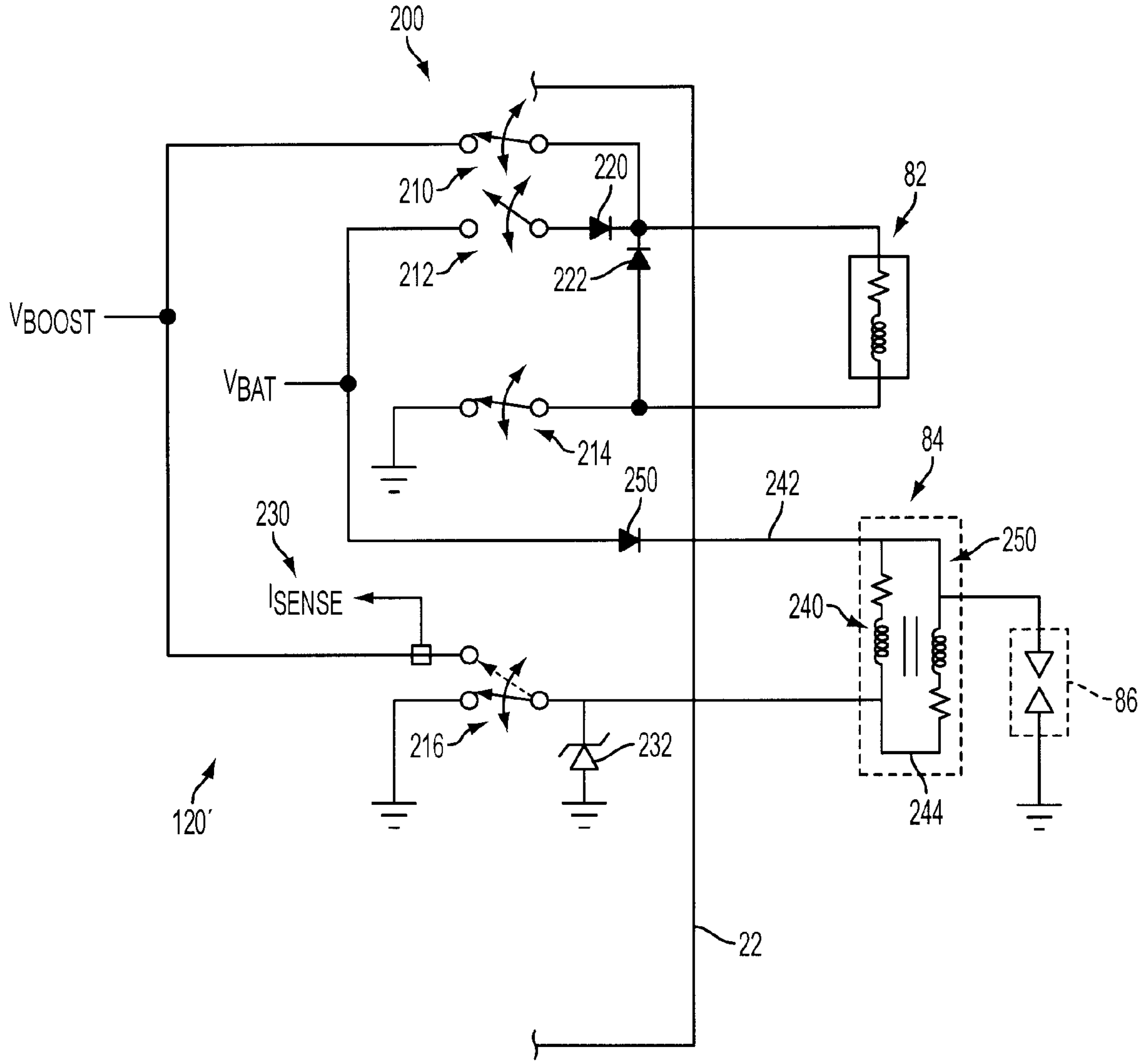
FIG. 3 is a simplified schematic illustrating an alternative embodiment of an engine controller with a common power source for injectors and ion sense according to the present disclosure.

FIG. 3 is a simplified schematic of an alternative embodiment of a high-voltage power supply for ionization sensors and fuel injectors according to the present disclosure. In this embodiment, fuel injector solenoid 82 is operated as previously described with respect to FIG. 2. However, power supply 120' uses battery voltage to charge ignition coil 84 through diode 250 and selectively connects the boosted voltage to side 244 of primary winding 240 via switch 216 to collapse the magnetic field in coil 84 and initiate the spark event. As such, in this embodiment, the ignition coil is controlled by selectively switching side 244 of primary winding 240 between the high voltage power supply and ground. The boosted voltage provides a bias across the gap of spark plug 86 that facilitates generation of an ionization current signal 230 as conducting ions are formed during the subsequent combustion of the fuel/air mixture within the associated cylinder.

As such, the present disclosure includes embodiments that provide a shared high-voltage power supply for ionization current sensors and fuel injectors that facilitates ionization current sensing whether or not a spark plug discharge is provided, such as in compression ignition engines or operating modes including diesel engines and HCCI engines, for example. The availability of a high-voltage power supply in spark-ignited applications for use in charging the ignition coil facilitates more agile ignition timing with shorter ignition coil charge times and shorter dwell times, which in turn provides a larger time period for collecting ionization current data, which is typically masked during coil/spark discharge. Using a single high-voltage power supply to actuate injectors and ionization sensing according to the present disclosure may also provide a cost savings and reduce the number of control module pins required when the power supply is integrated in the engine controller.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed:

1. An engine powered at least in part by a battery having a battery voltage, comprising:

a fuel injector;

at least one ionization sensor; and at least one common power supply connected to the fuel injector and at least one ionization sensor for supplying a voltage higher than the battery voltage for operation of the fuel injector and the ionization sensor at least during an ionization sensing period after spark discharge.

2. The engine of claim 1 wherein the ionization sensor comprises a spark plug.

3. The engine of claim 2 further comprising:

an ignition coil having a primary winding with a first side connected to the common power supply at least during the ionization sensing period and a secondary winding connected to the spark plug.

4. The engine of claim 3 wherein the ignition coil primary winding has a second side connected to battery voltage and wherein the ignition coil is controlled by switching the first side between the common power supply and ground.

5. The engine of claim 3 wherein the ignition coil primary winding has a second side selectively connected to ground and wherein the ignition coil is controlled by switching the second side between an open circuit and ground.

6. The engine of claim 2 wherein the spark plug ignites a fuel/air mixture within the cylinder during operation of the engine and wherein the power supply applies a bias voltage to the spark plug after spark discharge to induce an ionization current indicative of combustion within the cylinder.

7. The engine of claim 1 further comprising a microprocessor-based engine controller in communication with the fuel injectors and at least one ionization sensor, wherein the common power supply is contained within the engine controller.

8. The engine of claim 1 wherein the power supply provides substantially the same nominal voltage to the at least one fuel injector and the at least one ionization sensor.

9. The engine of claim 1 wherein each fuel injector is positioned within a corresponding cylinder to inject fuel directly into the cylinder in response to a control signal.

10. A method for controlling a multiple cylinder internal combustion engine having a fuel injector and ionization sensor, the method comprising:

selectively supplying substantially the same voltage to the fuel injector and the ionization sensor from a common high-voltage power supply having a nominal voltage higher than nominal voltage of a vehicle battery.

11. The method of claim 10 wherein the ionization sensor comprises a spark plug.

12. The method of claim 11 wherein selectively supplying comprises selectively connecting the high-voltage power supply to a primary winding of an ignition coil associated with the spark plug.

13. The method of claim 11 wherein selectively supplying comprises connecting the high-voltage power supply to a first side of a primary winding of an ignition coil associated with the spark plug and selectively connecting a second side of the primary winding to ground.

14. The method of claim 10 wherein selectively supplying comprises:

supplying battery voltage to a primary winding of an ignition coil to charge the ignition coil; and supplying high voltage to the primary winding during an ionization current sensing period after discharging the ignition coil.

15. The method of claim 10 wherein the fuel injector comprises a direct-injection fuel injector for injecting fuel directly into a corresponding cylinder during operation.

16. A multiple cylinder engine comprising:

a fuel injector associated with each cylinder and injecting fuel directly into the cylinder during operation;

a spark plug associated with each cylinder and selectively operating as an ignition source and ionization sensor;

an ignition coil connected to at least one of the spark plugs;

a high voltage power supply in communication with a battery having an associated battery voltage, the power supply supplying substantially the same nominal boosted voltage relative to nominal battery voltage to each fuel injector and ignition coil during at least a portion of the engine operation; and a controller in communication with the ignition coil and fuel injector.

17. The engine of claim 16 wherein the ignition coil includes a primary winding with a first side connected to the high voltage power supply at least during an ionization sensing period and a secondary winding connected to the spark plug.

18. The engine of claim 17 wherein the ignition coil primary winding has a second side connected to battery voltage and wherein the ignition coil is controlled by switching the first side between the high voltage power supply and ground.

19. The engine of claim 17 wherein the ignition coil primary winding has a second side selectively connected to ground and wherein the ignition coil is controlled by switching the second side between a high impedance and ground.

20. The engine of claim 17 wherein the controller is a microprocessor based engine controller and the high voltage power supply is integrated into the controller.

* * * * *